(No Model.)
J. MOHR.
PUNCHING MACHINE.
No. 501,152. Patented July 11, 1893.
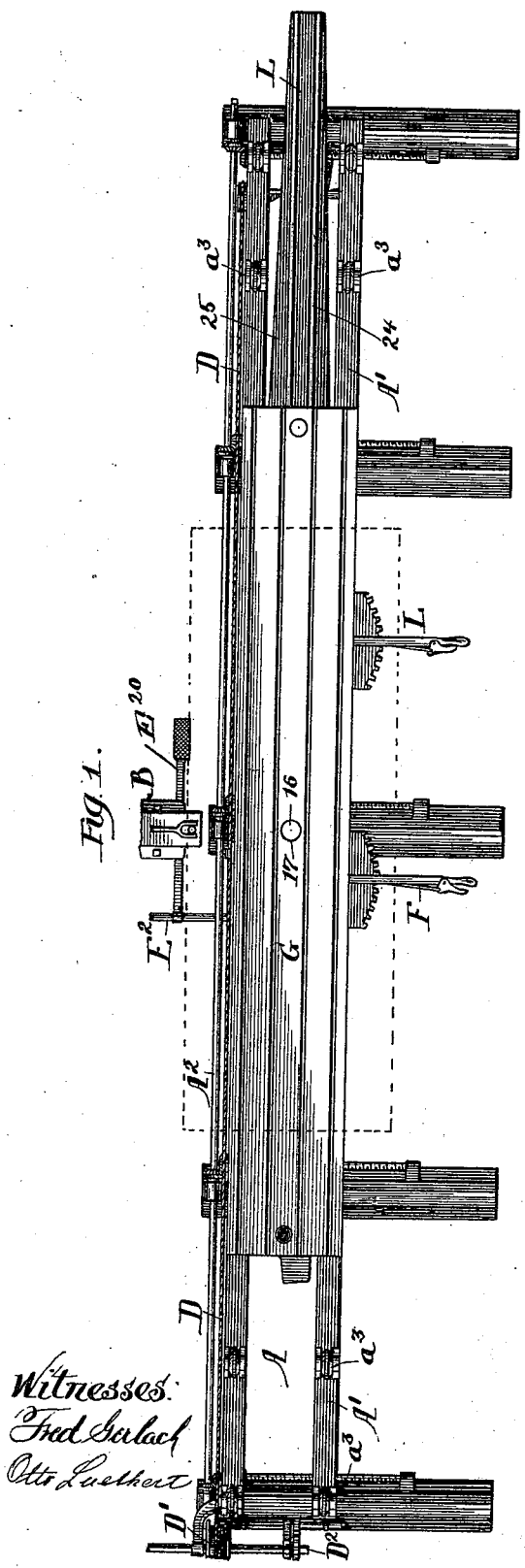
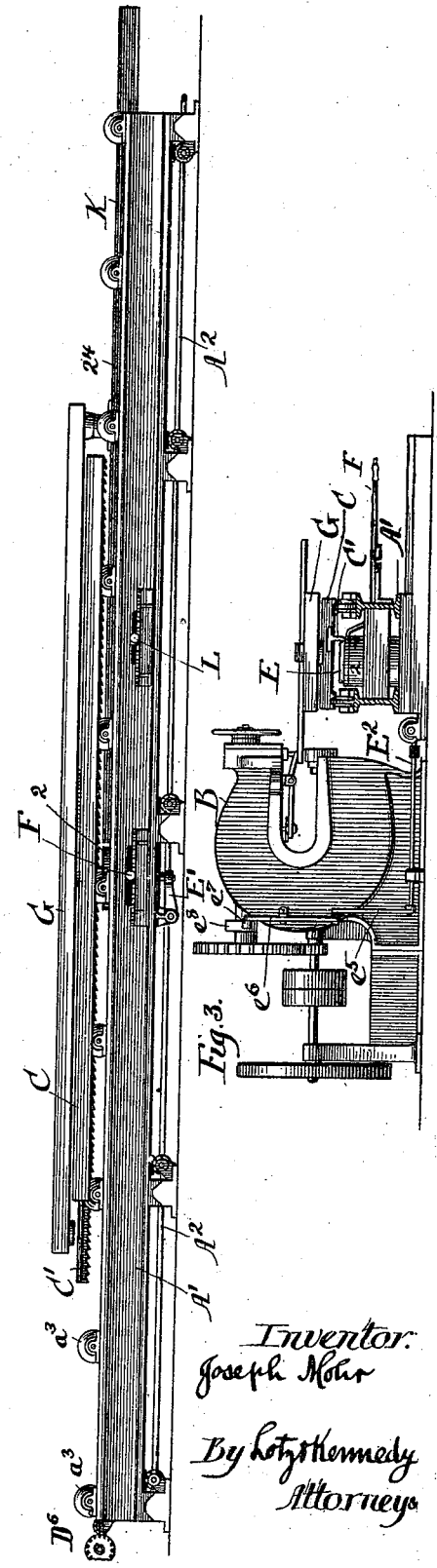
Witnesses:
Fred Gerlach
Otto Luethert
Inventor:
Joseph Mohr
By Lotz & Kennedy
Attorneys

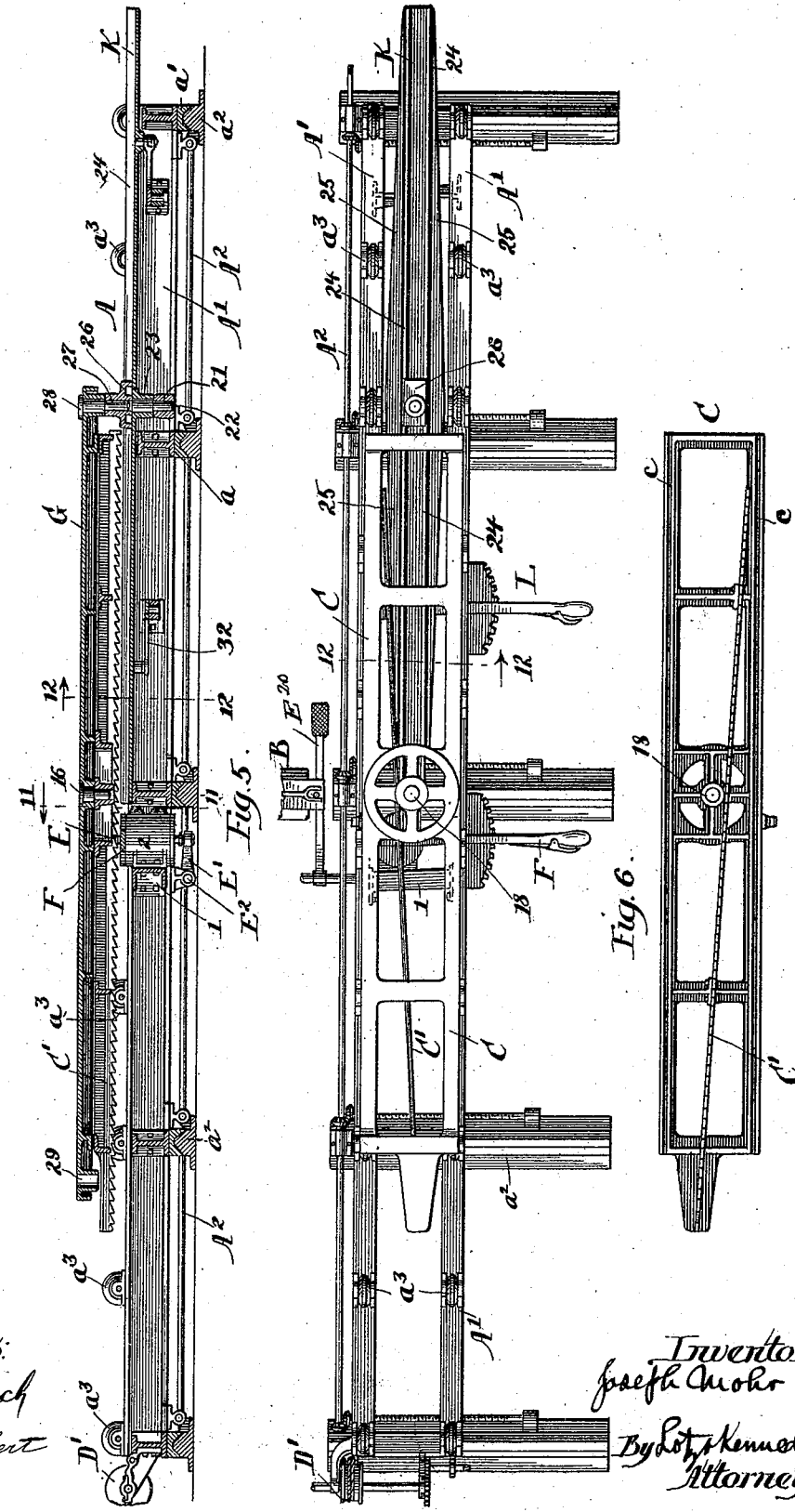

(No Model.)
6 Sheets—Sheet 3.
J. MOHR.
PUNCHING MACHINE.
No. 501,152.
Patented July 11, 1893.
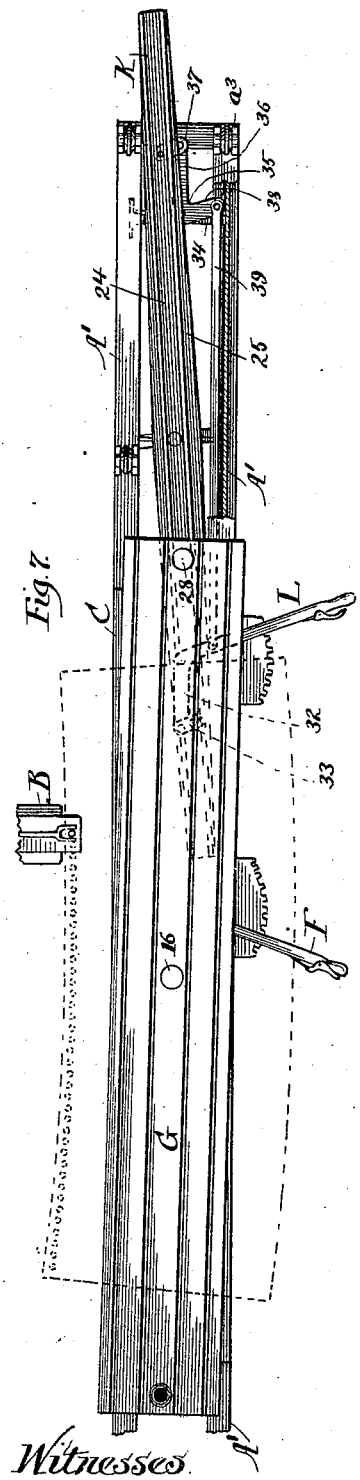
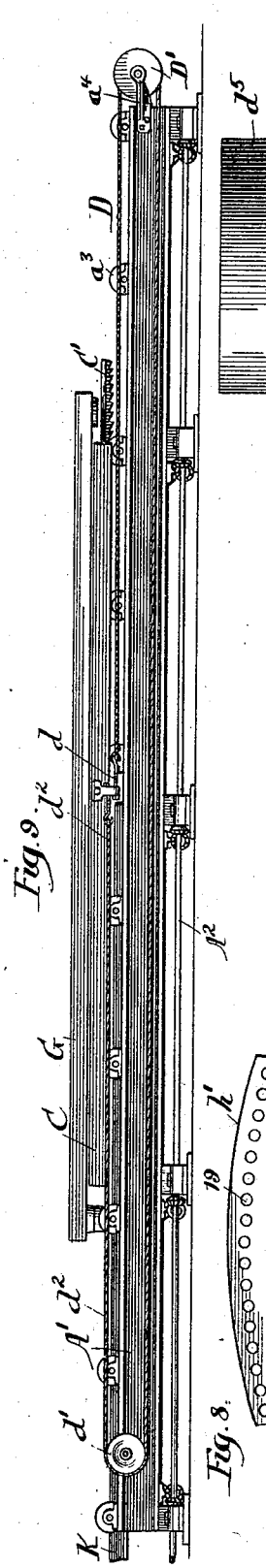
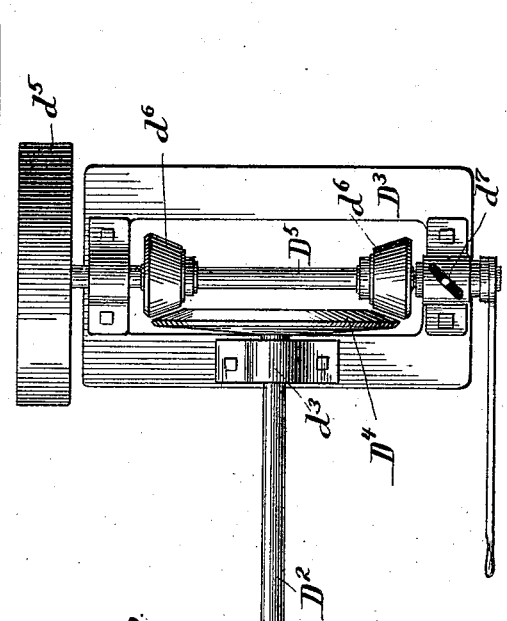
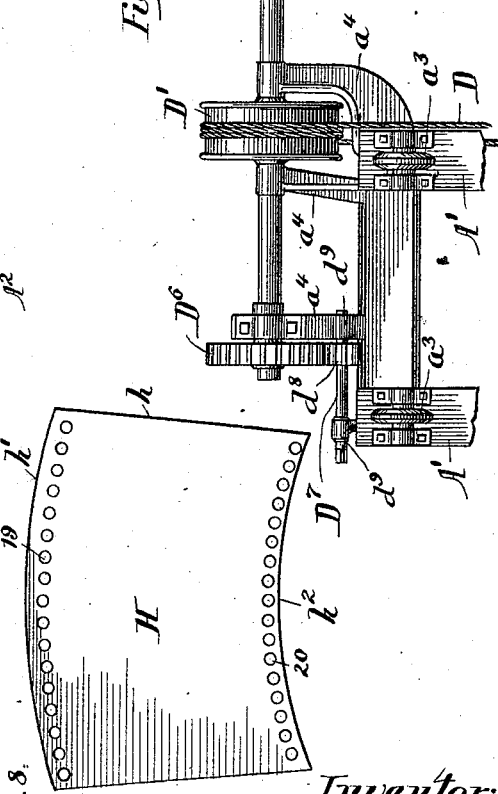
Witnesses
Fred Gerlach
Otto Luebkert
Inventor:
Joseph Mohr
By Fotzo Kennedy
Attorneys.

(No Model.) 6 Sheets—Sheet 4.

J. MOHR.
PUNCHING MACHINE.

No. 501,152. Patented July 11, 1893.

Witnesses:
Fred Gerlach
Otto Luebkert

Inventor:
Joseph Mohr
By
Lotz Kennedy Attorneys (No Model.) 6 Sheets—Sheet 5.
J. MOHR.
PUNCHING MACHINE.
No. 501,152. Patented July 11, 1893.
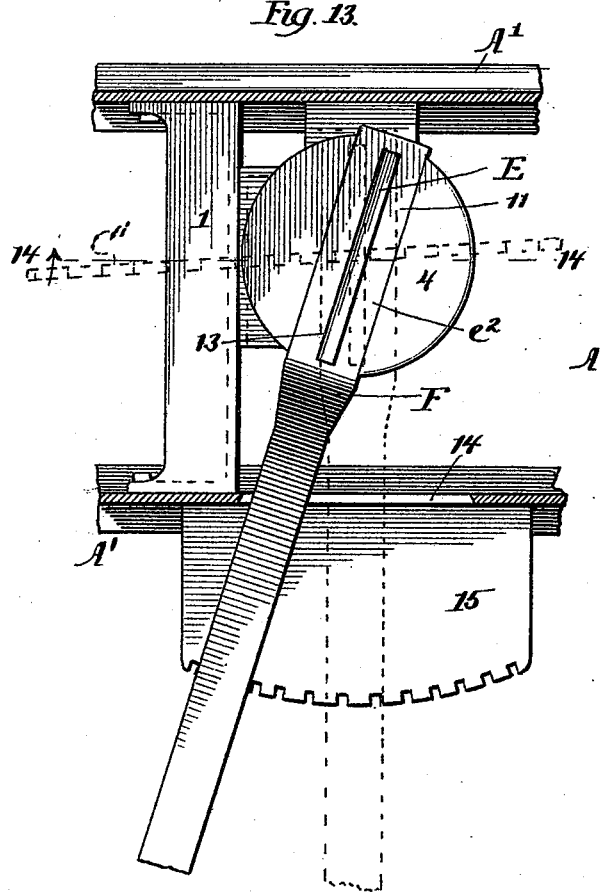
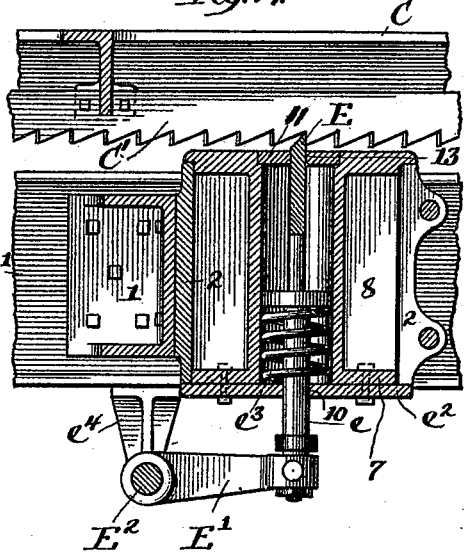
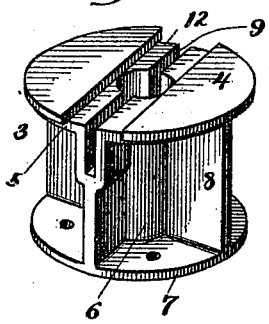
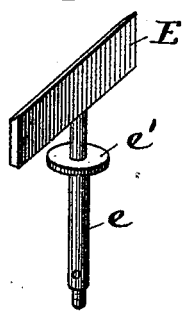
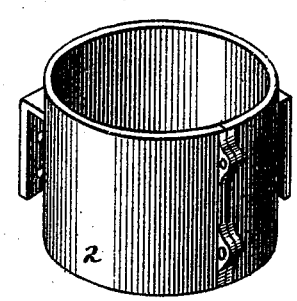
Witnesses:
Fred Gerlach
Otto Luckhert
Inventor
Joseph Mohr
By
Lotz & Kennedy Attorneys.

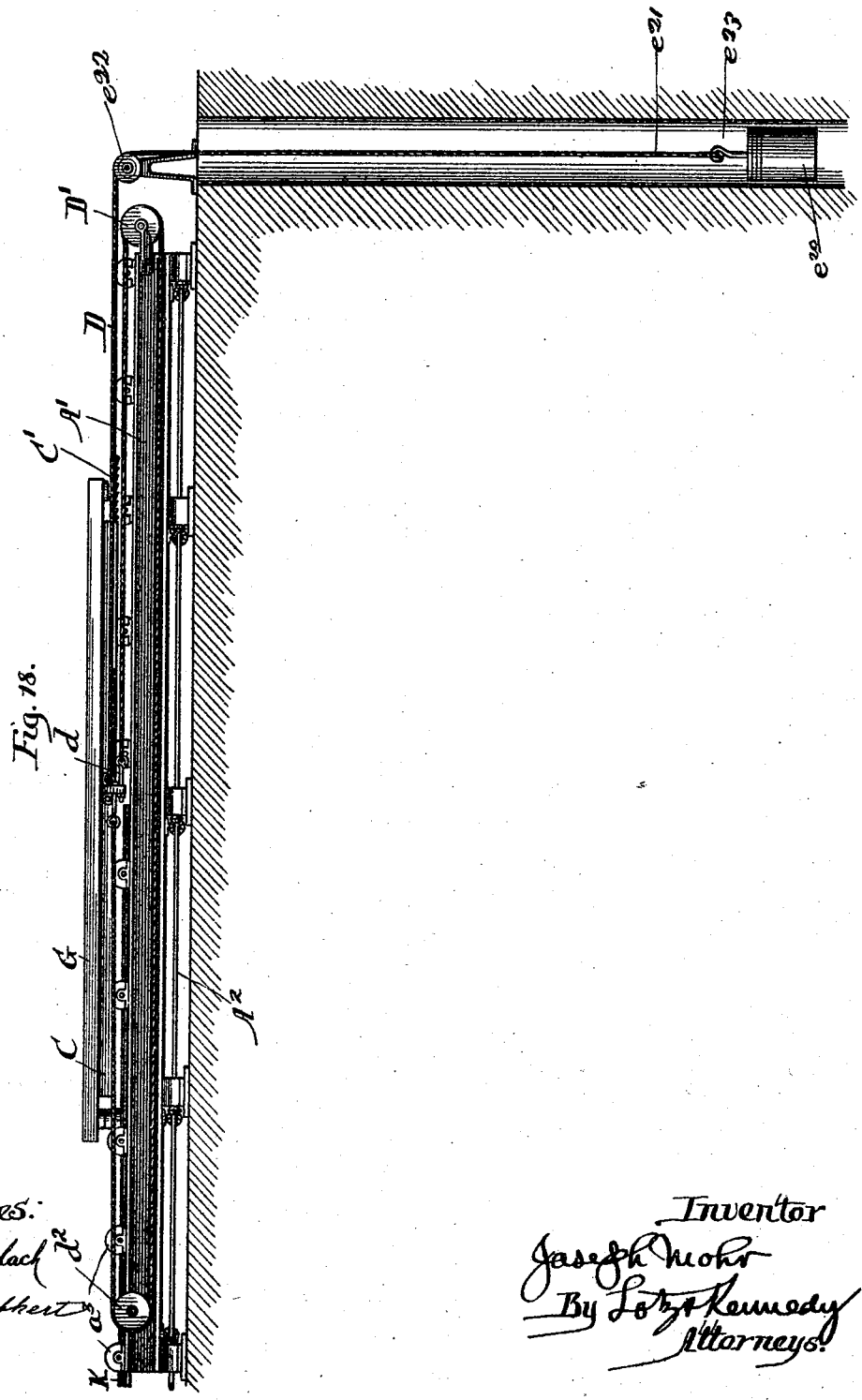

UNITED STATES PATENT OFFICE.

JOSEPH MOHR, OF CHICAGO, ILLINOIS, ASSIGNOR TO JOHN MOHR & SON, OF SAME PLACE.

PUNCHING-MACHINE.

SPECIFICATION forming part of Letters Patent No. 501,152, dated July 11, 1893.

Application filed May 11, 1891. Renewed June 12, 1893. Serial No. 477,379. (No model.)

*To all whom it may concern:*

Be it known that I, JOSEPH MOHR, a citizen of the United States of America, residing at Chicago, in the county of Cook and State of Illinois, have invented certain new and useful Improvements in Punching-Machines, of which the following is a specification, reference being had therein to the accompanying drawings.
This invention relates to a novel construction in punching machines, and more particularly to the movable bed upon which the work is carried during the punching operation.

The invention is designed primarily for use in punching the rivet holes in boiler plates, but it will be understood that it can be used in any other connection as found convenient. In forming the rivet holes in what is commonly known as a "taper boiler-plate," said holes must be nearer each other along one edge of the plate, than at the other edge, and must be regularly located, and in curved boiler-plates the said rivet holes must be made upon a curved or segmental line.

The objects of this invention are to provide a punching machine with devices for regulating the feed of the bed to accomplish the above named results, said feed-regulating devices being controlled automatically, or by an operator, and to provide for the general efficiency of the machine.

To the attainment of the foregoing and other useful ends the invention consists in the features of construction and combinations of parts hereinafter fully described and pointed out in the appended claims.

Figure 11:
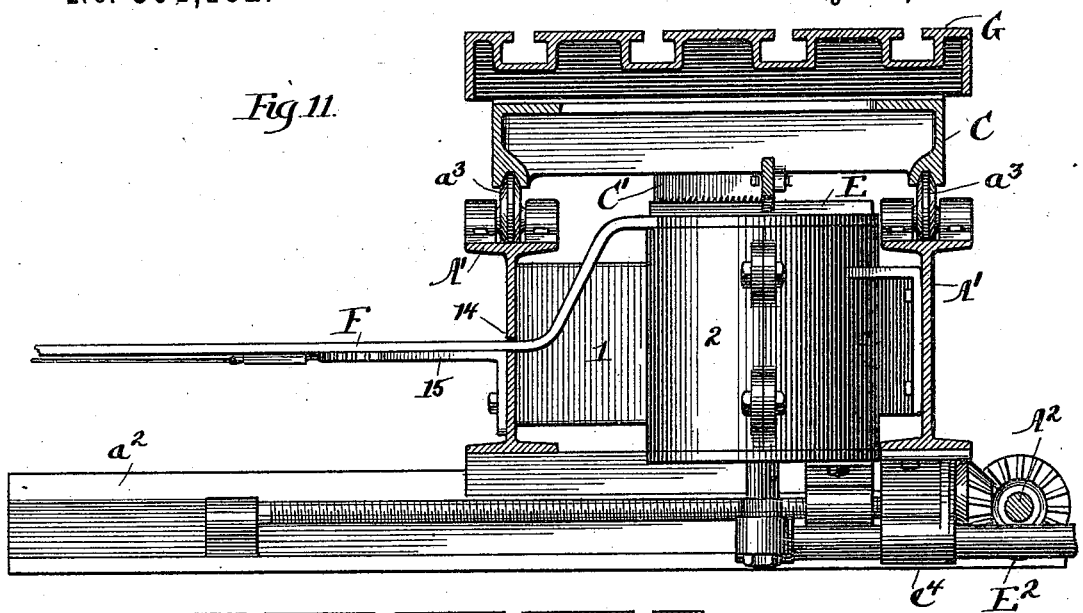
Figure 12:
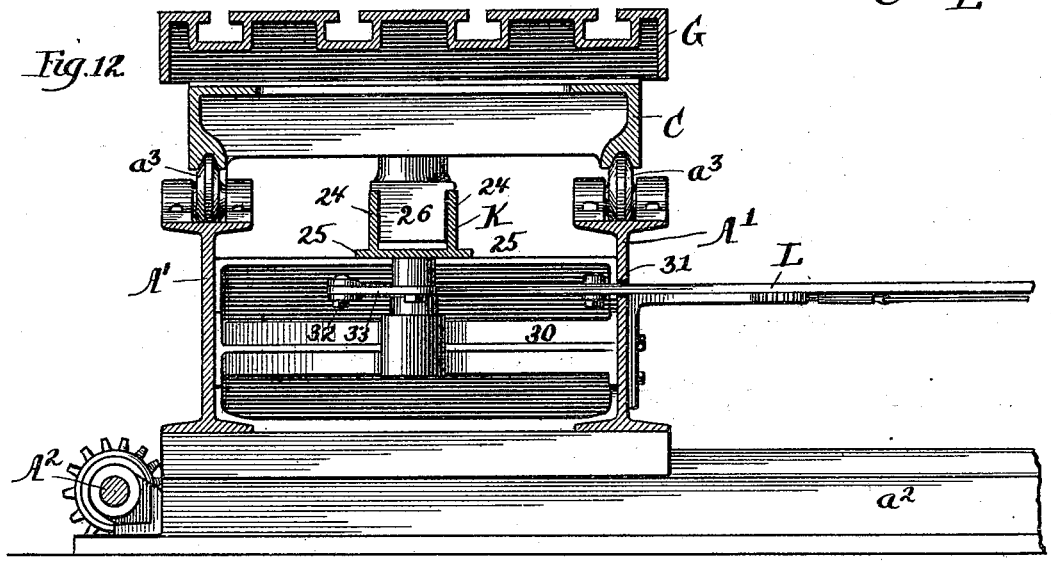

In the accompanying drawings, illustrating the said invention and in which like characters of reference indicate like parts,—Figure 1 is a plan view of a machine constructed in accordance with my invention, and showing a part only of the punch. Fig. 2 is a front elevation of the same. Fig. 3 is an end elevation with the main frame shown partly in cross section. Fig. 4 is a vertical, longitudinal section with certain parts in elevation. Fig. 5 is a plan view with the bed removed. Fig. 6 is a bottom plan view of the reciprocating carriage for carrying the bed. Fig. 7 is a plan view of the machine with the parts in the positions they will assume when operating upon a curved boiler-plate, certain parts being omitted for convenience of illustration. Fig. 8 shows a curved boiler-plate. Fig. 9 is a rear elevation. Fig. 10 is a plan view, on an enlarged scale, of the devices for moving the reciprocating carriage and bed, said devices being partly shown at the left-hand end of the machine in Fig. 1. Fig. 11 is a vertical, transverse section on the line 11—11 of Fig. 4. Fig. 12 is a vertical transverse section on the line 12—12 of Fig. 4. Fig. 13 is a detail plan view of the adjustable frame for regulating the feed of the carriage, with the rack shown in dotted lines. Fig. 14 is a vertical section on the line 14—14 of Fig. 13, with the carriage, rack and certain other parts in elevation. Figs. 15, 16 and 17 are detail views in perspective of the component parts of the adjustable pawl, and Fig. 18 shows one manner in which the carriage can be fed forward.

Referring to said drawings, A indicates as a whole the main frame of the machine upon which the majority of the operative parts hereinafter to be described are mounted. Said main frame A comprises two side beams A' A' connected by cross pieces $aa$. The said cross-pieces $a$ are provided on their under faces with guides $a'$ $a'$ located transversely to the length of the main frame, and which rest and slide upon the tracks $a^2$ $a^2$. The main frame is thus capable of being moved toward and away from the punch B located at one side of said main frame. To move said main frame it is preferable to employ a shaft $A^2$ running the entire length of the machine and which is geared to transverse screw shafts supported in bearings upon the tracks $a^2$ and engaging nuts upon the said main frame. Said shaft $A^2$ can be turned by a hand-crank or by power.

The reciprocating carriage C, (Figs. 5 and 6) which carries the work bed, is provided on its under face and near each side with longitudinal grooves $c$ $c$, and mounted in bearings upon the beams A' are rollers $a^3$ $a^3$ which enter the grooves $c$. The said carriage slides back and forth upon these rollers and is guided by the same. The carriage can be moved back and forth upon the main frame by various means, but as a simple and convenient manner a rope or cable D (Fig. 9) is employed which is connected at one end $d$ with the carriage about midway between its ends, and then passes forwardly, or to the right in Fig. 9, and is turned several times around a drum $D'$ at the forward end of the main frame. After passing around said drum $D'$, it passes along the side of one of the beams $A'$ and around a pulley $d'$ mounted upon said beam near its rear end and is then carried forward and secured to the carriage $d^2$ as shown. The said drum $D'$ can be turned in either direction so as to move said carriage back and forth. It is obvious that various constructions for driving said drum can be employed, one of which consists of a driving shaft $D^2$ (Fig. 10) upon which the drum is rigidly mounted. Said shaft is mounted in bearings $a^4$ $a^4$ at the forward end of the main frame, extends to one side, passes through a bearing $d^3$ upon the side piece of a rectangular frame $D^3$, and is provided with a parallel friction disk $D^4$. At right angles to said shaft $D^2$ and mounted in bearings $d^4$ $d^4$ upon the frame $D^3$ is a shaft $D^5$ provided outside said frame $D^3$ with the driving pulley $d^5$. Two friction disks $d^6$ $d^6$ are mounted upon the shaft $D^5$ on opposite sides of the center of said disk $D^4$, and either one of said disks $d^6$ can be thrown into engagement with the said disk $D^4$ or both can be thrown out of engagement by a suitable clutch $d^7$ of familiar construction, by means of which the shaft $D^2$ will be turned in opposite directions or will remain stationary. It is obvious that the carriage is fed forward between each downward movement of the punch, and to accomplish such pulsatory feed, the operator or attendant operates the clutch $d^7$ so as to throw one of the friction disks $d^6$ into and out of engagement with the friction disk $D^4$ for each downward stroke of the punch, as will be plainly obvious. Means are also provided for turning the shaft $D^2$ by hand, and for this purpose the end of said shaft opposite to that to which the disk is secured, is provided with a gear $D^6$ which intermeshes with a gear pinion $d^8$ upon a short shaft $D^7$ mounted in bearings $d^9$ and upon the main frame. Said short shaft $D^7$ is provided with a squared end for a hand crank.

In Fig. 18 is shown an additional mechanism for feeding the carriage, which comprises a weight $e^{20}$ connected by a cable $e^{21}$ with the carriage. The said cable desirably passes over a pulley or sheave $e^{22}$ and the weight is located in a well $e^{23}$. It will thus be seen that the weight exerts a constant pull on the carriage and moves the same forward at such times as it is not held by the pawl hereinafter fully described. It will of course be understood that the cable can be trained over suitable sheaves and the weight located outside the building and above ground if desired, without departing from my invention.

The bed upon which the work is secured and carried during the operation of the machine is mounted upon and carried by the carriage C as will be more fully described hereinafter. The construction for regulating and controlling the forward feed of the carriage will now be described. As before explained, the rivet holes are punched at regular intervals along the edge of the sheet, so that the forward feed of the carriage between each downward movement of the punch will be the same. To accomplish the above result a toothed bar or rack $C'$ is rigidly secured to the carriage (Figs. 4, 5, 6 and 14). The teeth $c'$ $c'$ project downwardly and face in the direction of the forward feed of the carriage. A vertically movable pawl E is located beneath the carriage and engages the teeth of said rack $C'$. The said pawl E is held normally in engagement with said rack and is capable of being drawn from engagement therewith to permit the movement of the carriage. In feeding the carriage forwardly the said pawl is retracted momentarily at stated intervals from engagement with the teeth of the rack whereupon the carriage will be moved forwardly by the mechanism described. The pawl E however returns immediately to its former position and engages the next tooth of the rack, thereby holding the carriage stationary until the pawl is again retracted. Devices for automatically retracting the pawl E and then allowing it to assume its normal position between each downward stroke of the punch, are provided and will now be described.

It will be understood that if desired the pawl could be moved in both directions positively by suitable mechanism connected therewith which both retracted and forced it forward, but it is preferable to have a direct and positive pull to retract the pawl against a spring resistance, so that when the force which retracts it ceases, the spring will immediately return it. The mechanism for accomplishing this movement is shown in Figs. 6, 11 and 14. The pawl E is provided with a spindle $e$ having a collar $e'$ and passing through a plate $e^2$ hereinafter to be fully described. A spring $e^3$ acting by expansion is located between the collar $e'$ and bottom plate $e^2$, and serves to hold the pawl normally elevated. The said spindle is pivoted at its lower end to the free end of an arm $E'$ which projects from a rock shaft $E^2$ hung in a bearing $e^4$ attached to the main frame (Figs. 11 and 14). The said shaft $E^2$ is located transversely to the length of the main frame, and as shown in Fig. 3, extends along the base of the punch B and is provided with an upwardly projecting arm $e^5$ pivoted at its upper end to a vibrating lever $e^6$ which is provided at its upper end with a small friction roller $e^7$ located to ride over a cam surface $e^8$ carried by the shaft that operates the die of the punch. The said cam $e^8$ makes one revolution during each stroke of the die, and is provided with an abrupt shoulder next to its highest portion. The parts are so located that during the upward stroke of the die, the highest part of the cam will engage the friction roller and through the intermediacy of the vibrating lever $e^6$, arm $e^5$, rock shaft $E^2$ and arm $E'$, will pull down the pawl E from the rack against the action of the spring $e^3$, but as soon as this movement is accomplished, the high part of the cam will pass by the friction roller, and the said spring $e^3$ will again elevate the pawl E. It will thus be seen that the pawl is retracted but for a moment for each downward movement of the die and engages the next tooth on the rack, so that the carriage moves forward during such intervals the distance between two teeth of said rack.

In Figs. 1 and 5 a foot lever $E^{20}$ is shown which is connected with the shaft $E^2$ and extends to the other side of the punch B in position to be operated by the attendant; upon depressing said foot lever $E^{20}$ the pawl can be held retracted to permit the carriage to be run back to the rear end of the frame.

To vary and control the feed of the carriage the pawl E is pivoted centrally so that it can be swung in either direction upon its pivotal point from a position at right angles to the path of the carriage. In Figs. 4, 5, 11 and 14 said pawl is shown as located at right angles to the path of the carriage. To vary the feed of the carriage the said pawl is swung upon its pivot in either direction according to whether it is desired to increase or decrease the feed. In Fig. 13 the pawl is shown in the position it will assume when it is located to decrease the feed, namely, at an angle with its forward end portion nearest the front end of the main frame. As the rack C upon the carriage moves along, it will be noted that its point of contact with the pawl will be such that the forward movement of the carriage will not be as great as when the pawl is located at right angles to the same. On the other hand, however, when the pawl is swung to the other side of its transverse position, the point of contact with the rack will be such as to increase the feed of the carriage, as will be obvious. As a further and separate improvement, the rack C is located at an angle to the length of the carriage, so that the variation in the feed of the carriage caused by the shifting of the pawl E will be greater than if said rack were parallel with the length of the carriage. The particular construction of the devices for adjusting said pawl are constructed as follows: Secured to a cross-piece 1 located about midway between the ends of the main frame, and in the angle formed by said cross-piece 1 and one of the side beams of said main frame, is a hollow cylindric pivot support 2 open at both ends (Figs. 4, 5, 11, 13 to 17). The pivot frame 3 fits within said support, and said frame is provided on its upper end with a cover or disk 4 having an annular rabbet 5 in its outer and lower edge which rests upon the upper edge of the cylindric support 2 and forms a sliding joint therewith shown in Fig. 14. A central hollow stem 6 depends from the disk 4 and is provided at its lower end with an annular flange 7 whose lower edge is even with the lower end of the cylinder. The said flange 7 fits within the cylinder, and a plate $e^2$ secured to the lower face of said flange overlaps the lower edge of the cylinder as shown in said Fig. 14, thereby serving to hold the said pivot frame rigidly within the pivot support or cylinder and at the same time to allow a pivotal movement between said parts. For the purpose of strengthening said pivot frame, it is provided with webs 8 connected with the stem and with the disk and flange. A radial notch 9, extending across the cylinder, is made in the upper portion of the pivot frame, and the frame E is located within said notch and upper portion of the hollow stem with its spindle $e$ extending downwardly and through an opening 10 in the bottom plate $e^2$ as before described. The spring $e^3$ located between the collar $e'$ and the plate $e^2$ has been described above. The joint between the spindle $e$ and the arm $E'$ carried by the rock shaft is such that it provides a pivotal connection between said arm and spindle and at the same time allows said spindle to turn relatively to said arm, the particular construction involving a collar on the end of the arm E revolubly secured to said spindle. The said pawl E is shifted by means of a lever F having a rectangular end portion 11 fitting within a radial recess 12 in the top of the pivot frame 3 and provided with a longitudinal opening 13 through which the upper end of the pawl projects. The said operating lever F extends along a slot 14 in the main frame and is provided with a handle and a detent adapted to engage with a notched plate 15 in a familiar manner, and by means of which the pawl can be secured in its adjusted position. It is plainly obvious that the construction above described permits the pawl to be easily and quickly adjusted, and its angular position to be definitely determined and controlled, so that the distance between the holes in the boiler-plates can be regulated with precision.

The work bed G is longer and wider than the carriage, (Figs. 2, 3, 4, 9, 11 and 12) and is centrally pivoted upon the carriage about midway between its ends, said pivotal connection consisting of a pivot pin 16 located within apertures 17 and 18 in said bed and carriage. It will thus be seen that the work bed can be turned upon the carriage to bring either side adjacent the punch, so that when a sheet is secured to said bed and the holes have been punched along one edge by running the carriage back to the rear end of the main frame, the said bed can be turned on its pivot to bring the other edge of the sheet adjacent the punch.

In Fig. 8 a taper sheet H is shown having the straight tapering sides $h\ h$, and the long and short sides $h'$ and $h^2$ forming segments of a circle. It is obvious that the holes 19 in the long side $h'$ of the sheet must be farther apart than the holes 20 in the short side of the seat, and further that said holes must be made on a curved line for obvious reasons. The difference between the distance of the holes 19 and the holes 20 can be secured by the shifting of the pawl C, and the construction for feeding said plate in a curved line will now be described.

K indicates an adjustable guide located beneath the carriage between the side beams A' of the main frame and in the rear part of said main frame or in the rear of the pawl E (Figs. 1, 2, 4, 5, 7 and 12). To a cross-support 21 secured between the sides pieces A' the guide K is centrally pivoted by means of a pivot pin 22 passing through a stud 23 on the under face of said guide and engaging an aperture in said cross-support 21. The said guide is provided with upright parallel longitudinal flanges 24 extending its full length and forming a guide-way. In Figs. 1 and 5 the said guide is located parallel with the main frame, and to permit it to be turned on its pivot its sides are tapered toward both ends from its center as shown at 25 that sufficient space is provided between its sides and the side pieces A' to allow it to be turned as shown in Fig. 7. An aperture block 26 fits and slides between the flanges 24 and is provided with an aperture 27 adapted to receive a pivot pin 28 that passes through an aperture 29 in the end portion of the bed. Both end portions of the bed are provided with an aperture 29 that either end of said bed may be connected with the guide K. It will thus be seen that the position of the guide controls the direction of movement of the bed by reason of the sliding pivotal connection between said parts attained by the sliding blocks located between the flanges of said guide and having a pivotal connection with the bed. Consequently, when the guide is located parallel with the main frame and bed as shown in Figs. 1, 5 and 12, the said bed will travel back and forth in a straight line. When it is desired, however, to punch the holes in a curved line as shown in Fig. 8, the guide is turned on its pivot so as to be at an angle to the main frame and bed as shown in Fig. 7. It will be manifest therefore, that as the carriage travels in a straight line from toward the front end of the main frame, the pivot block 26 traveling between the guide flanges 24 of the guide will cause the work bed G, with which said pivot block has a pivotal connection, to turn gradually and regularly on its pivotal connection with said carriage as said carriage advances, and thereby carry the sheet upon said work bed on a curved line past the punching die as illustrated in said Fig. 7. It will of course be seen that by varying the angular position of the guide the curve upon which the holes are punched can be regulated. I have provided means for shifting said guide which are constructed in the following manner: In Figs. 2, 4, 5, 7 and 12 a hand lever L is shown which is pivoted at its inner end to a support 30 located between the side pieces A' of the main frame and adjacent to the front end portion of the guide. This said lever L projects through a slot 31 in the front side piece A' and is provided with a detent arranged to engage a notched plate in a familiar manner. The said lever is provided at its inner end with an arm 32 located at an angle thereto and extending toward the forward end of the main frame, and a link 33 pivoted to the end of said arm 32 is also pivoted to the lower face of the guide near its front end (Figs. 4, 7 and 12). Near the rear end of the main frame and upon a suitable support 34 located between its side pieces, a bell crank lever 35 is pivoted, and the rearwardly projecting arm 36 of said bell crank lever is connected with the rear end portion of the guide by means of a link 37 which is pivoted to said guide and to said arm 36. The other arm 38 of said lever 35 projects outwardly and is pivotally connected by means of a rod 39 with the hand lever L outside of its pivot. Referring to Fig. 7 it will be assumed that it is desired to shift the guide. By throwing the lever to the left, the arm 32 will pull the forward end of the guide inwardly. Simultaneous with the movement the rod 39 is drawn forward, thereby turning the bell-crank lever on its pivot and throwing its arm 36 outward which exerts an outward pull upon the rear end of the guide. It will thus be seen that by throwing the lever to the right or left a positive pull will be exerted upon the ends of the guide in opposite directions so that said guide is easily and accurately shifted.

I claim as my invention—

1. The combination substantially as hereinbefore set forth in a punching machine, of a reciprocating work bed having a notched or toothed portion, a supporting frame for said bed, a pawl located transversely to said notched or toothed portion and supported by a suitable frame, a spindle depending from said pawl and connected with devices for retracting the same, and a spring located between a collar on said spindle and said frame.

2. The combination substantially as hereinbefore set forth in a punching machine, of a reciprocating work bed having a notched or toothed portion, a supporting frame therefor, a pawl for engaging said notched or toothed portion, devices for operating said pawl, a revoluble pivot frame upon which said pawl is supported, said pivot frame being supported by a suitable support secured to said supporting frame, and a lever connected with said pivot frame for turning the same.

3. The combination substantially as hereinbefore set forth in a punching machine, of a reciprocating work bed having a notched or toothed portion, a supporting frame therefor, a pawl for engaging said notched or toothed portion, devices for operating said pawl, a pivot frame 3 having a notch 9 within which said pawl is located, a pivot support 2 for said pivot frame, and a lever for turning said pivot frame.

4. The combination substantially as hereinbefore set forth in a punching machine, of a reciprocating work bed having a notched or toothed portion, a supporting frame therefor, a pawl for engaging said notched or toothed portion, devices for operating said pawl, a pivot frame 3 supporting said frame and having a recess 12 for the end portion of an operating lever, and a pivot support 2 for said pivot frame.

5. The combination substantially as hereinbefore set forth in a punching machine, of a reciprocating work bed having a notched or toothed portion, a supporting frame therefor, a pawl for engaging said notched or toothed portion, devices for operating said pawl, a pivot frame 3 having a notch 9 within which said pawl is located, and a recess 12 for the end portion of an operating lever, and a pivot support 2 for said pivot frame.

6. The combination substantially as hereinbefore set forth in a punching machine, of a supporting frame, a pivotally supported reciprocating work bed having a pivotal and sliding connection with a pivoted guide, and an operating lever connected with said guide on opposite sides of its pivot and serving to exert a pull in opposite directions on the end portions of said guide.

7. The combination substantially as hereinbefore set forth in a punching machine, of a supporting frame, a pivotally supported reciprocating work bed having a pivotal and sliding connection with a pivoted guide, an operating lever having an arm connected with said guide to one side of its pivot, and a bell crank lever having one arm connected with said guide to the other side of its pivot, the other arm of said bell crank lever being connected with said operating lever.

In testimony whereof I affix my signature in presence of two witnesses.

JOSEPH MOHR.

Witnesses:
HENRY MOHR,
HARRY COBB KENNEDY.